United States Patent

Brinning

[15] 3,691,352

[45] Sept. 12, 1972

[54] DOCUMENT READING APPARATUS

[72] Inventor: Earl E. Brinning, Detroit, Mich.

[73] Assignee: Burroughs Corporation, Detroit, Mich.

[22] Filed: June 9, 1971

[21] Appl. No.: 151,174

[52] U.S. Cl. ....................235/61.11 C

[51] Int. Cl. ....................G06k 7/015

[58] Field of Search....235/61.7 B, 61.11 R, 61.11 A, 235/61.11 C, 61.11 D, 61.11 E; 340/149 R, 149 A; 250/219 DC

[56] References Cited

UNITED STATES PATENTS

| | | | |
|---|---|---|---|
| 2,817,480 | 12/1957 | Baldwin | 235/61.11 E |
| 2,848,535 | 8/1958 | Hunt, Jr. | 235/61.11 E |
| 3,076,599 | 2/1963 | Smith | 235/61.11 E |
| 3,227,860 | 1/1966 | Blodgett | 235/61.11 C |
| 3,238,357 | 3/1966 | Minka | 235/61.11 E |
| 3,351,744 | 11/1967 | Masterson | 235/61.11 E |

*Primary Examiner*—Daryl W. Cook
*Attorney*—Kenneth L. Miller and Edwin W. Uren

[57] ABSTRACT

Apparatus is provided for receiving punched documents of predetermined varying widths and lengths, and for readably feeding such variously dimensioned documents through a read station. During this readable feeding of the documents, a column count circuit is triggered in synchronism with the reading of columns of coded information and inhibited through the sensing of the trailing edges of the documents when the last column of coded information has been read. By this means embossed areas that may be present on certain of the documents following the last column of coded information may be fed through the read station without the risk of false reading resulting from spurious signals generated by such embossed areas.

16 Claims, 14 Drawing Figures

INVENTOR.
EARL E. BRINNING

BY Edwin W. Uren
AGENT

PATENTED SEP 12 1972

3,691,352

DOCUMENT READING APPARATUS

CROSS-REFERENCE TO RELATED APPLICATION

The logic and circuitry aspects of the inventive document reading apparatus are disclosed and claimed in an application by Merlino et al., Ser. No. 120,867, which was filed on Mar. 4,1971 and which bears the title "-Punched Card, Badge and Credit Card Reader." In the Merlino et al application, general reference is made to the synchronized activation of a column count wheel and the document feeding means, and to sensors and switches that are associated with the variously dimensioned documents, such sensors and switches being responsive to the leading edges of documents to trigger the column count circuitry in synchronism with the reading of columns of coded information, and being also responsive to the trailing edges of the documents to inhibit the column count circuitry when the last column of coded information has been read. Included also in the Merlino et al. application is general reference to the reading of cards of 40 or less columns of coded information during a single operating cycle, and to the reading of cards of more than 40 columns of coded information during two successive operating cycles. The present application is directed in particular to the mechanical aspects of the inventive document reading apparatus, including cycle enabling and initiating means, document feeding means, means for synchronizing the column count wheel with the feeding means, cycle terminating means, and means for re-establishing the synchronized relationship between the column count wheel and the feeding means at the end of a read cycle.

BACKGROUND OF THE INVENTION

As mentioned in the Merlino et al. application, the subject document reading apparatus is designed to fill a need in terminal units of computer systems wherein advantages would obtain if various kinds of input data such as I.D. numbers, account numbers and transaction information could be entered automatically by a single input unit, such data and information being customarily encoded on separate documents of varying widths and lengths. The details with respect to the particular environment in which the subject apparatus would be applicable, the advantages of the apparatus over the prior art, as well as the objects of the invention may be gleened through reference to the above-identified Merlino et al. application.

SUMMARY OF THE INVENTION

Important aspects of the invention are the provision in a single document reading device of means for receiving documents of predetermined varied widths and lengths, such that the first column of coded information on each inserted document bears a predetermined relationship relative to the column count wheel, means for advancing the variously dimensioned documents through a read station in synchronism with the operation of the column count wheel, means for producing either one or two operating cycles depending upon the length of the inserted document, means for terminating an operating cycle when the last column of coded information on the inserted document has been read, and means for precisely re-establishing the home positioning of the column count wheel and the document feeding means following the termination of a read cycle.

BRIEF DESCRIPTION OF THE DRAWING

A clear understanding of the structure and mode of operation of the preferred embodiment of the document reading apparatus may be derived from the following description when read with reference to the accompanying drawings in which.

DETAILED DESCRIPTION OF THE INVENTION

The previously mentioned application by Merlino et al. discloses and claims document reading apparatus that is effective for receiving and reading punched documents of predetermined varying widths and lengths, the variously dimensioned documents being receivable and feedably readable by the apparatus without any preliminary adjustment. A requirement of the variously dimensioned documents is that the columns of information coded thereon bear a predetermined standard relationship relative to two orthogonal edges of each document. A significant aspect of the apparatus disclosed by Merlino et al. is the provision of a column count wheel and associated circuitry for generating a signal each time a column of information is in a position to be read, such column count signals cooperating with information pulses produced by the reading means each time a column of coded information is read. This column count circuitry is inhibited upon the sensing of the trailing edge of a document coincidentally with the reading of the last column of coded information.

The present application discloses the structural characteristics of a card reader embodying the Merlino et al. concept, and which is effective for receiving punched documents of varying widths and lengths and for readably advancing such variously dimensioned documents through a read station such that the pulses produced by the rotating count wheel in cooperation with the column count circuit are precisely synchronized with the signals generated by the individual columns of coded information, such precise synchronization being critical to the efficient operation of the document reading apparatus.

Figures 1, 10:
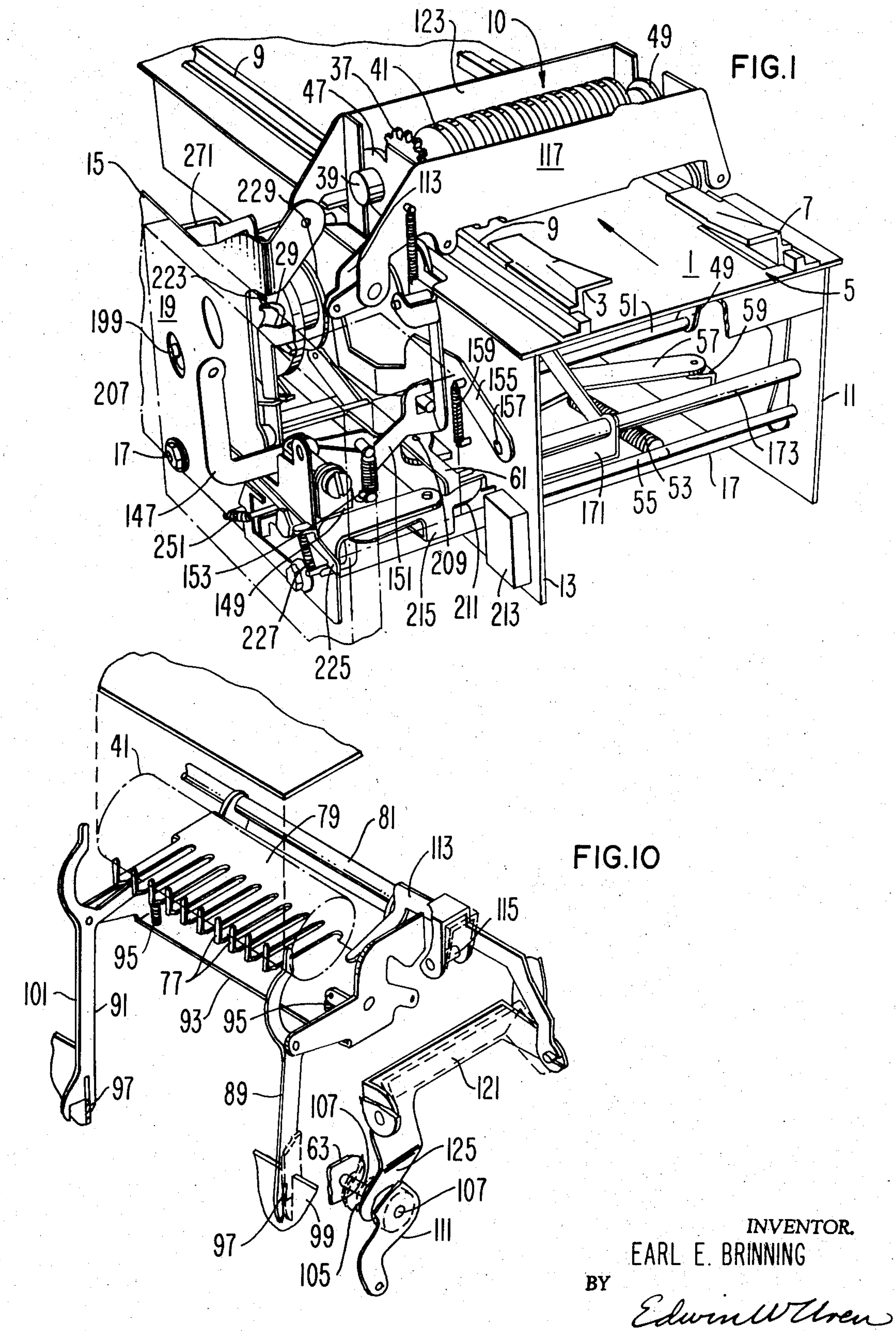
FIG. 1 is a perspective view of the apparatus taken from the left front corner.
FIG. 10 is a partial perspective view taken from the left rear corner and showing the stop bail and the enabling bail in greater detail.

With reference to FIG. 1, punched documents of predetermined varying widths and lengths are placed on a table 1 with their leftmost edges abutting a stationary bottom-edge support 3 forming an insertion throat 5 in cooperation with a biased upper-edge support 7, the latter support serving to hold the leftmost or bottom edges of the documents in abutting relationship with a bottom-edge guide 9 as the document is advanceably fed in the direction of the arrow of FIG. 1, past a read station generally designated at 10. A right frame member 11, left frame member 13 and auxiliary frame member 15 connected by a pair of shafts 17 provide support for the various mechanisms of the document reading apparatus, and may be so disposed in a terminal unit as to permit the feedable transport of the documents while in a substantially vertical plane. A motor 19 is mounted to the auxiliary frame member 15 and is provided with a driving short shaft 21 (best shown in FIG. 2) to which is attached a latch gear 23. The latch gear 23 is engageable by a biased clutch dog 29 pivotally mounted on a cam disk 25 fixed to a driven shaft 27 which is journaled in the frame members 11 and 13, to thereby couple the driven shaft 27 to the driving short shaft 21. Fixed to the driven shaft 27 is a gear 31, a lower grooved roller 33 extending the approximate width of the table 1, and a column count wheel 35, best shown in FIG. 9, said column count wheel being fixed to the rightmost extremity of the shaft 27, to correspond to the column count wheel referred to in the Merlino et al application.

The gear 31 is cooperably engaged with a pair of inter-biased companion gears 37, one of which is fixed to a movable shaft 39 which is also provided with an upper grooved roller 41. The grooves in the rollers 33 and 41 serve to accommodate a plurality of star wheels 42 (FIG. 8) which are similar in construction to a star wheel 43 associated with the column count wheel 35 (as shown in FIG. 9). The star wheels 42 are associated with an information reading mechanism 45 which is also illustrated in FIG. 8, but which is not considered to be a part of the present invention.

Figure 2:
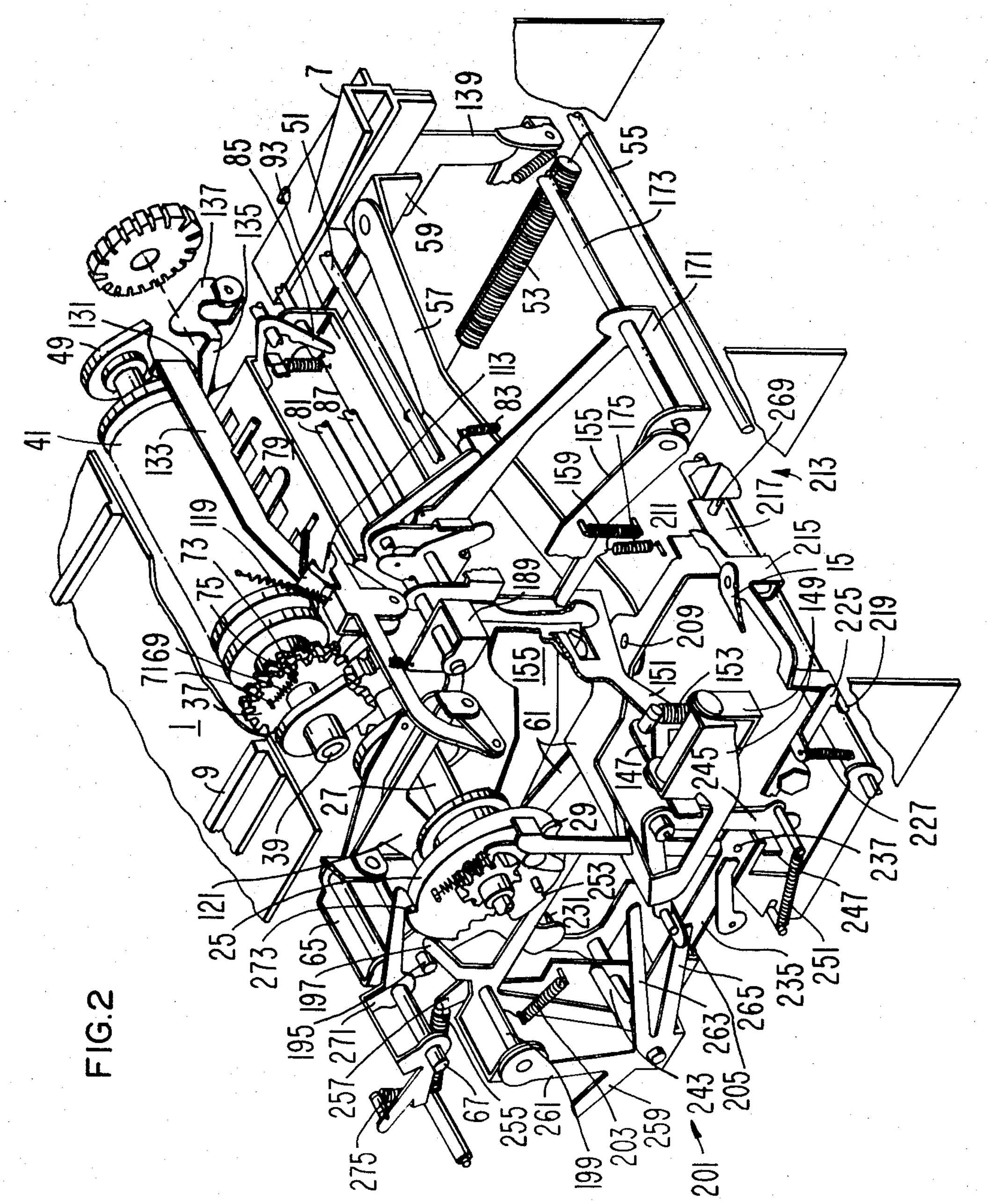
FIG. 2 is an enlarged perspective view showing the various operating areas and many of the parts associated therewith.
Figure 6:
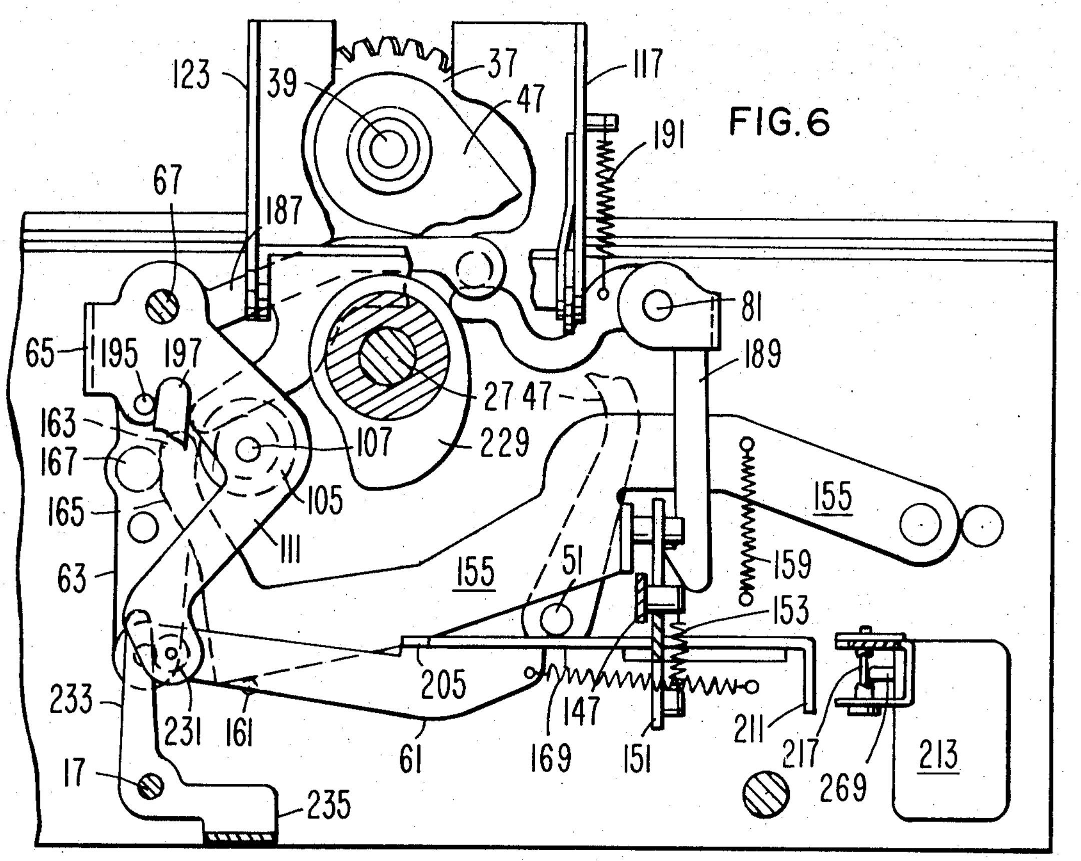
FIG. 6 is a sectional view taken along the line 6—6 of FIG. 3.
Figure 7:
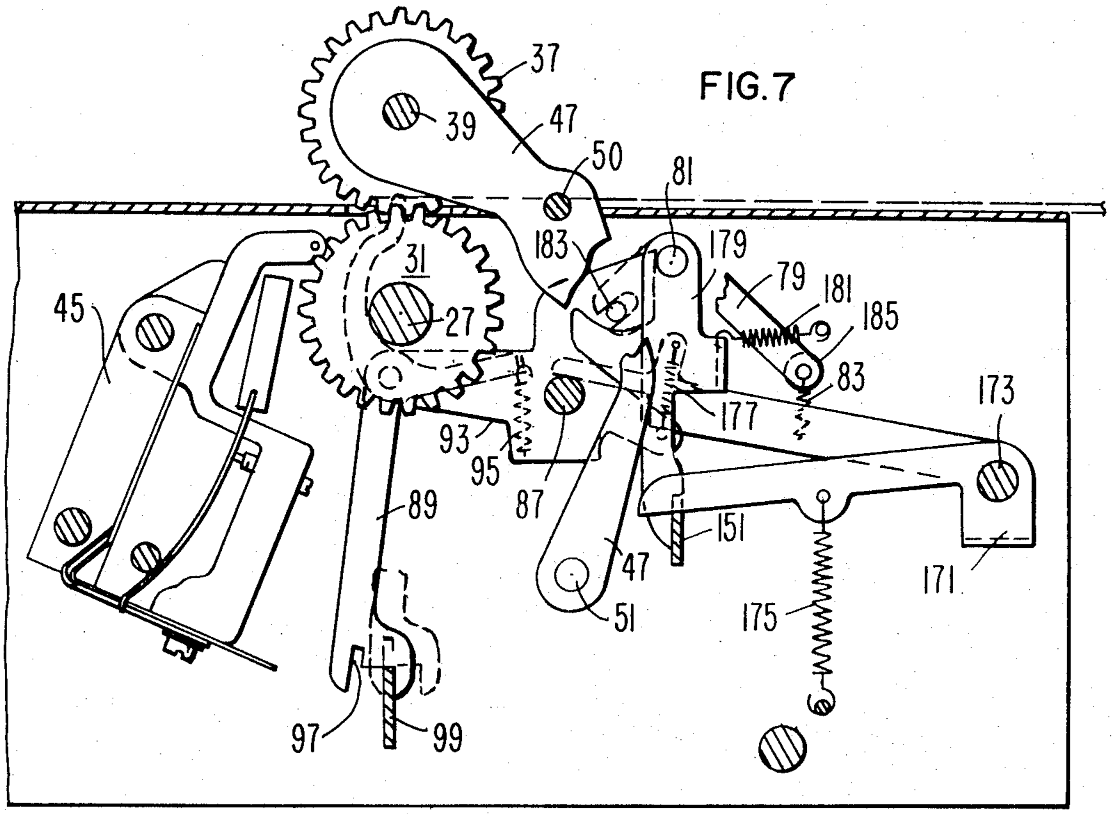
FIG. 7 is a sectional elevation taken along the line 7—7 of FIG. 3.

The shaft 39 and upper grooved roller 41 are rotatably journaled in a pair of cradle arms 47 and 49, which are pivotally mounted on the frame members 13 and 11, respectively, by means of a pair of pivot pins best shown at 50 in FIG. 7. The lowermost extremities of the cradle arms 47 and 49 are connected by a shaft 51 which is best illustrated in FIGS. 1 and 2, and which is biased forwardly by a spring 53 connected to the shaft 51 and to a shaft 55 supported by the frame members 11 and 13. The bias of the spring 53 serves to urge the shaft 51 and the cradle arm assembly formed by the arms 47 and 49 in a counterclockwise direction on the pivot pins 50, to thereby urge the upper grooved roller 41 into contacting relationship with the lower grooved roller 33. The bias of the spring 53 is normally counteracted by a limit arm 57 which is pivotally supported by an angle member 59 fixed to the frame member 11, and which is pivotally connected also to a trip slide 61 best illustrated in FIGS. 2 and 6. The trip slide 61 is pivotally connected to a downwardly directed arm 63 of a three-armed bail 65, the latter bail being pivotally supported on a shaft 67 connecting the frame members 13 and 15. The trip slide 61 is latched in a cocked state by hereinafter described means when the document reader is at rest, to thereby blockably position the limit arm 57 in a clockwise-rocked position (as viewed in FIG. 2) on the angle member 59. Since the limit arm 57 is disposed in the same plane as the shaft 51 of the cradle arm assembly 47–49, the clockwise positioning of the arm 57 by the trip slide 61 is also effective to hold the upper grooved roller 41 in a clockwise displaced position relative to the lower grooved roller 33, against the bias of the spring 53.

The displacement of the upper roller assembly 41 from the lower grooved roller 33 is such that the companion gears 37 are retained in engaged relationship with the gear 31 fixed to the driven shaft 27. The companion gears 37 are normally displaced one from the other by a spring 69 connected to a stud 71 fixed to the leftmost gear 37 and to a stud 73 fixed to the rightmost gear 37 and extending through an aperture 75 formed in the leftmost gear. This biased displacement of the companion gears 37 is effective to maintain a secure engaged relationship as between the companion gears 37 and the gear 31 fixed to the shaft 27, when the upper grooved roller 41 is in either a displaced or contacting relationship with the lower grooved roller 33.

Figure 3:
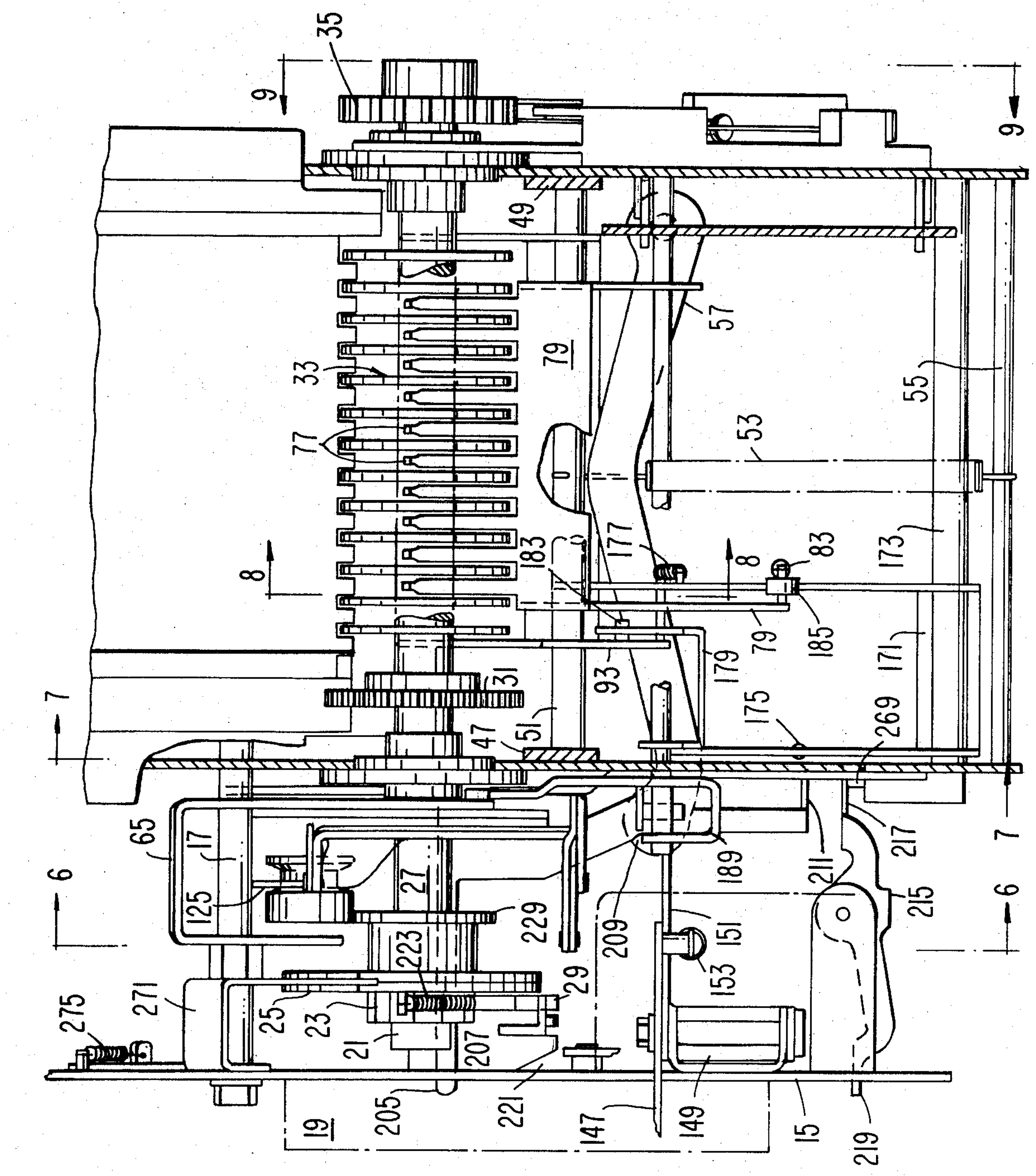
FIG. 3 is a plan view showing various of the parts in relationship with the three frame members.
Figure 8:
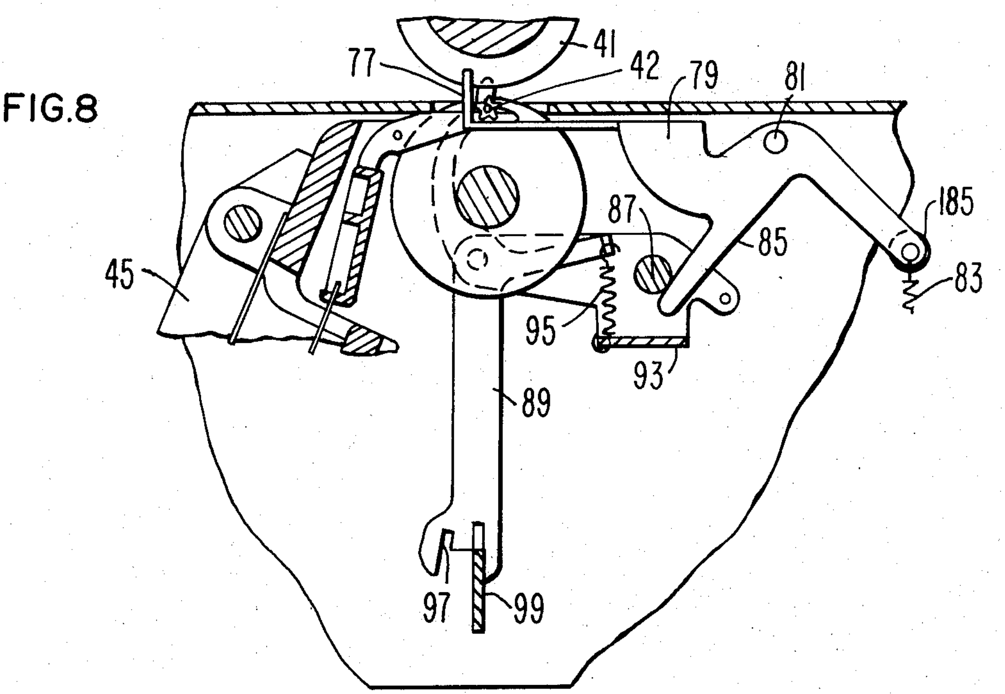
FIG. 8 is a partial elevation showing the movable stop bail and one of the enabling levers of the cycle enabling means.
Figure 9:
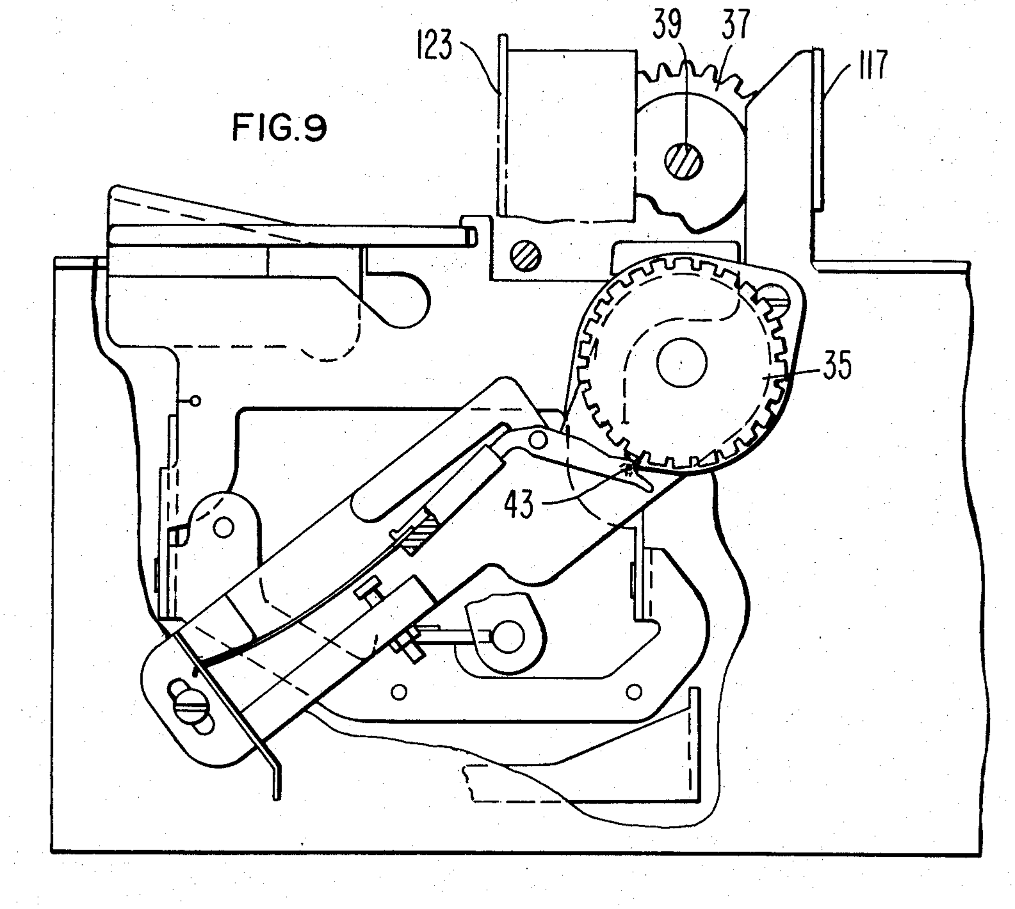
FIG. 9 is a right side elevation taken along the line 9—9 of FIG. 3 and showing the column count wheel in association with pulse generating means.

When a punched data card, credit card or badge is fully inserted into the throat 5 (FIG. 1) its leading edge comes into limitable contact with upwardly extending prongs 77 of a movable stop bail 79, as best shown in FIG. 3, 8 and 10. The stop bail 79 is rotatably mounted on a shaft 81 supported by the frame members 11 and 13, and is biased in a clockwise direction on the shaft 81 (as viewed in FIG. 8) by a spring 83 suitably anchored to a frame member (not shown), the clockwise biased position of the stop bail 79 being defined by contact of a projection 85 thereof with a shaft 87 also connecting the frame members 11 and 13.

Immediately preceding the limitable contact of the leading edge of an inserted document against the prongs 77 of the stop bail 79, cooperation will occur between the leading edge of the document and a pair of enabling levers 89 and 91 which are pivotally mounted on an enabling bail 93 supported by the shaft 87, as best shown in FIGS. 2, 8 and 10. Each of the enabling levers 89 and 91, which are pivotally mounted on opposite extremities of the enabling bail 93, is biased in a clockwise direction (as viewed in FIG. 8) on its respective pivotal mounting by a spring 95 connected to an offset projection thereof and to the enabling bail 93.

Figure 4:
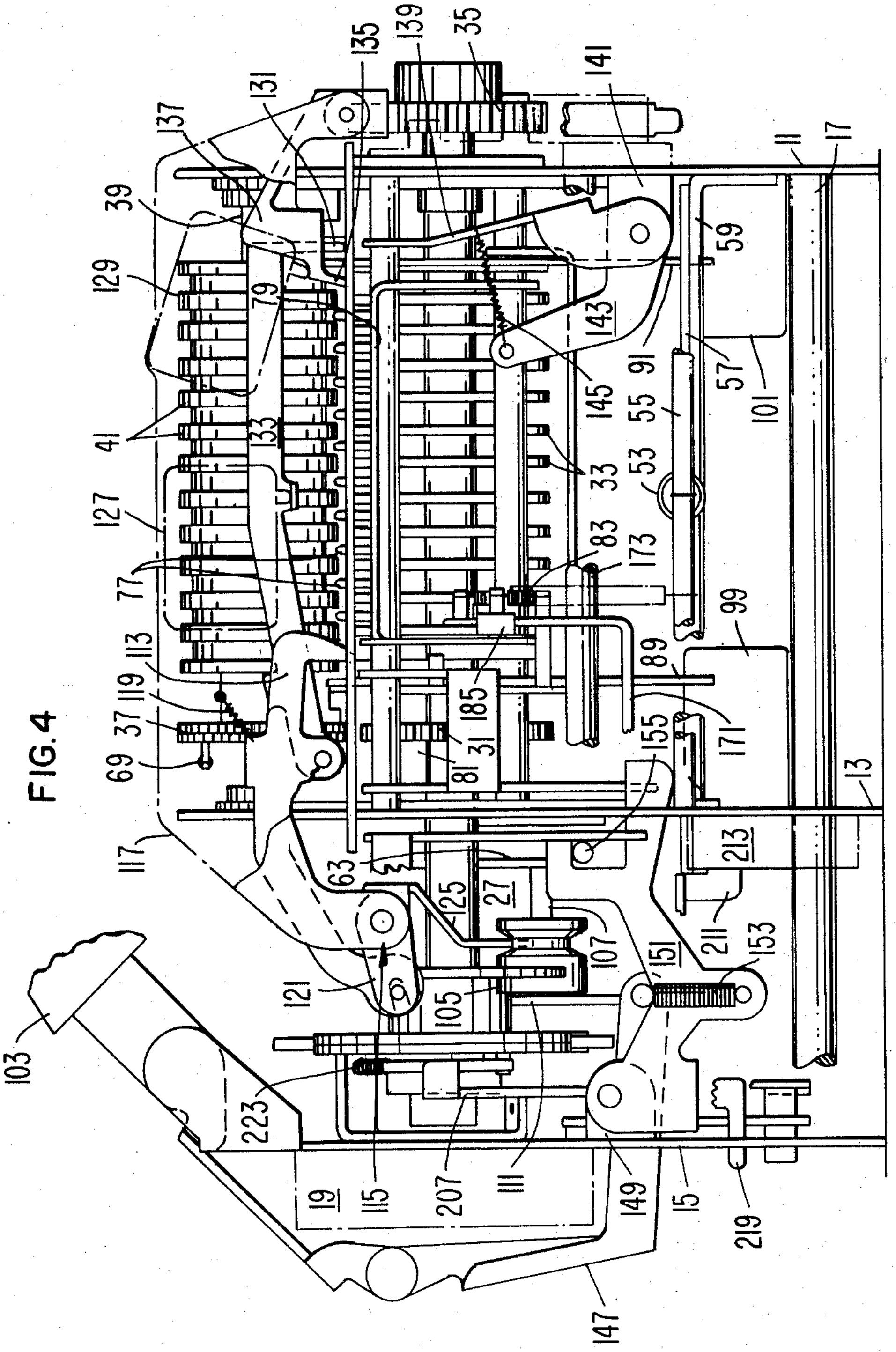
FIG. 4 is a front elevation of the document reading apparatus.

The function of the enabling levers 89 and 91 is to assure the proper orientation of the documents at the time they are inserted into the throat 5, such as when the right corner of the leading edge of each document is provided with a corner-cut. In such instance, the enabling lever 89, as shown in FIG. 8, would be provided with a deep groove 97 disposed to the left (rear) of the levers lowermost extremity, such groove in cooperation with a slotted web member 99 fixed to the frame member 13 permitting a predetermined downward translation of the enabling lever 89 when said lever has been rotated in a counterclockwise direction against the bias of the spring 95 by the leading edge of a document. The deep groove 97 of the rightmost enabling lever 91, on the other hand, would be disposed to the right (front) of the levers lowermost extremity, as shown in FIG. 10, to thereby permit the downward translation of the lever 91 when such lever has not been activated in a counterclockwise direction by the leading edge of a document, and to prevent such downward translation when the lever 91 has been so activated, the deep slot 97 of the lever 91 cooperating selectively with a slotted web member 101 fixed to the frame member 11. As is explained in a latter section, an operating key 103 shown in FIG. 4 is depressible to initiate a read cycle only when the enabling bail 93 is permitted a predetermined counterclockwise rotation on the shaft 87, such rotation requiring that both the enabling levers 89 and 91 be permitted a predetermined downward translation by means of the alignment of both deep grooves 97 with their respective web members 99 and 101. It can thus be seen that a read cycle can only be initiated when the enabling lever 89 is rotated in a counterclockwise direction by the leading edge of a document, and when the enabling lever 91 is permitted to remain in its clockwise-biased position due to the presence of a corner-cut on the right leading edge of the inserted document.

The insertion of a punched data card, credit card or badge, in addition to the above described activation of the enabling lever 89 of the enabling bail 93, also serves to displace a restoring roller 105 of the cycle terminating means from its home position on a supporting shaft 107 connecting the downwardly directed arm 63 of the three-armed bail 65 and a spaced-apart arm 111 thereof, as best shown in FIGS. 4 and 10. Displacement of the restoring roller 105, the function of which is described in a later section, is effectuated by the cooperation of the leading edge of an inserted document with a sensor 113 best shown in FIGS. 2, 4, and 10. The sensor 113 is pivotally mounted on a stud 115 (FIG. 10) connected to the interior surface of a closure member 117 (FIG. 1), and is biased in a clockwise direction on the stud 115 by a spring 119 (FIG. 2) connected thereto and to anchor stud also connected to the closure member 117. The outboard extremity of the sensor 113 is pivotally connected to an outer arm of a rockable bail 121 (as best shown in FIGS. 2 and 10), such bail being rockably mounted on and between the closure member 117 and a rear closure member 123. The bail 121 comprises an angularly and downwardly directed forked projection 125 (best shown in FIG. 4), the forked portion thereof being engaged with a peripheral groove formed in the restoring roller 105. It can thus be seen that the contact of the leading edge of a document with the sensor 113 is effective to displace the roller 105 in a rightward direction (as viewed in FIG. 4), by means of the counterclockwise rotation of the sensor 113 and the bail 121. Insertion of a document into the throat 5 is also effective, by means of the leading edge of the document, to activate one or both of a pair of switches 127 and 129 (FIG. 4), which are mounted on the interior surface of the closure member 117 (FIG. 1), such switches being instrumental in the operation of the electrical aspects of the inventive reading apparatus as disclosed and claimed in the Merlino et al. application. It can be seen from FIG. 4 that the switch 127 will be activated by a sensor 131 of a sensing arm 133 each time a credit card is inserted into the throat 5, the credit card being approximately .125 of an inch wider than a punched data card or a badge. It can also be seen that the switch 129 will be activated by a sensor 135 of a sensing arm 137 when a document of any predetermined width is inserted.

The structure of the biased upper-edge support 7 forming a part of the throat 5 and serving to hold the variously dimensioned documents in abutting contact with the bottom-edge support 3 and guide 9 may best be described with reference to FIGS. 2 and 4. The support 7 is mounted on the upper extremity of a pivotal bail member 139 that loosely extends through a longitudinal slot formed in the table 1, a pair of spaced-apart foot portions of the bail member 139 being pivotally mounted on a pair of spaced-apart offset web members 141 fixed to the frame member 11, the frontmost of these web members 141 only being shown in FIG. 4. The frontmost of the web members 141 is also provided with an angularly disposed projection 143 to the extremity of which one end of a spring 145 is connected, the other end thereof being connected to the bail member 139 to thereby bias the bail 139 and the upper-edge support 7 in an inboard direction.

With a document of predetermined variable width and length properly inserted into the throat 5, such that the enabling levers 89 and 91 are permitted a downward translation (as previously described), the operating key 103 (FIG. 4) may be depressed to initiate the various mechanical actuations hereinafter described. The operating key 103 is connected to a key link 147 which is pivotally mounted to the auxiliary frame member 15 by a mounting 149. Also pivotally mounted on the mount 149 is a forked link 151 which is spring connected to the key link 147 by a spring 153, the forked portion of the link 151 straddling a stud-like portion of a trip slide retainer arm 155 and extending through an aperture formed in the frame member 13, the retainer arm 155 being pivotally mounted to the frame member 13 as indicated at 157 in FIG. 1. The trip slide retainer arm 155 is biased in a counterclockwise direction on its pivot pin 157 by a spring 159 connected thereto and to the frame member 13, the trip slide retainer arm 155 being best illustrated in FIG. 6 where it is shown in cooperating relationship with the trip slide 61 and the three-armed bail 65 to which the trip slide is pivotally connected. A stud 161 fixed to the frame member 13 serves to define the home position of the retainer arm 155, against which it is held into contact by the spring 159, when the apparatus is at rest. An upright projection of the retainer arm 155 is provided with a flat surface 163 defined by a high point 165 thereof, the flat surface and high point functionally cooperating with a roller 167 fixed to the inboard side of the previously mentioned arm 63 of the bail 65. Accordingly, when the retainer arm 155 is disposed in its home position, the bail 65 and trip slide 61 are held in a precocked position against the urging of a spring 169 connected to the trip slide and to an anchor stud connected to the auxiliary frame member 15, such precocked position being defined by the limitable contact of the roller 167 of the bail 65 against the flat surface of the retainer arm 155.

With reference to FIGS. 2 and 7, depressible activation of the key link 147 produces a counterclockwise rotation of the forked link 151, as motivated by the spring 153, the trip slide retainer arm 155 being rotated in a clockwise direction on its pivot pin 157 against the bias of the spring 159, to thereby release the bail 65 and trip slide 61. An extension of the forked portion of the link 151 effectively rotates a bail 171 in a clockwise direction on a support shaft 173 connecting the frame members 11 and 13 against the bias of a spring 175 connected to the outboard arm of the bail 171 and to an anchor stud fixed to the frame member 13. Clockwise rotation of the bail 171 is effective to rotate the enabling bail 93 in a counterclockwise direction on its supporting shaft 87, as shown in FIG. 7, by means of a spring 177 connected to a stud on the inboard arm thereof and to a stud fixed to the enabling bail 93. Counterclockwise rotation of the bail 93 is effective to rotate a cycle enabling bail 179, which is also supported on the shaft 81, in a clockwise direction against the bias of a spring 181, such clockwise rotation of the bail 179 being accomplished by the cooperation of a stud 183 of the bail 93 with a slot formed in the inboard arm of the bail 179. The cycle enabling bail 179 is provided with a downwardly directed limit arm that blockably prevents full depression of the operating key 103 and the complete counterclockwise rotation of the forked link 151, when either of the enabling arms 89 or 91 is blocked against downward translation. With the cycle enabling bail 179 rotated in a clockwise direction on the shaft 81, the forked link 151 may be fully activated to initiate a read cycle, the continued clockwise rotation of the bail 171 by the forked link 151 additionally serving to rotate the stop bail 79 in a counterclockwise direction on the shaft 81 to thereby lower the prongs 77 (FIG. 10) from their blocking relationship relative to the leading edge of the inserted document, the counterclockwise rotation of the stop bail 79 being accomplished by contact of the inboard arm of the bail 171 against a roller 185 connected to an extension of the stop bail 79, as best shown in FIG. 2.

Figure 5:
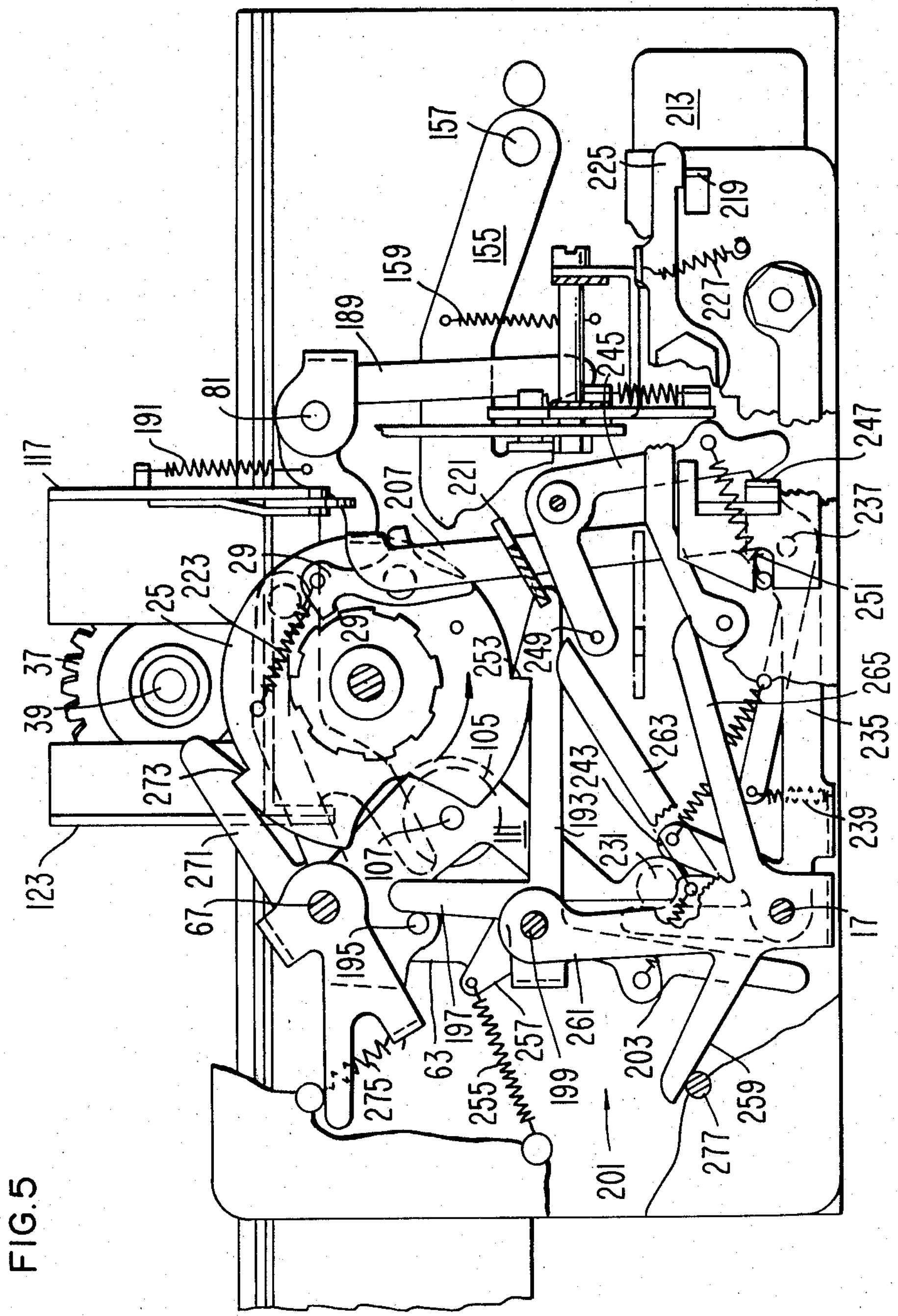
FIG. 5 is a left side elevation view with the auxiliary frame member removed.
Figure 11:
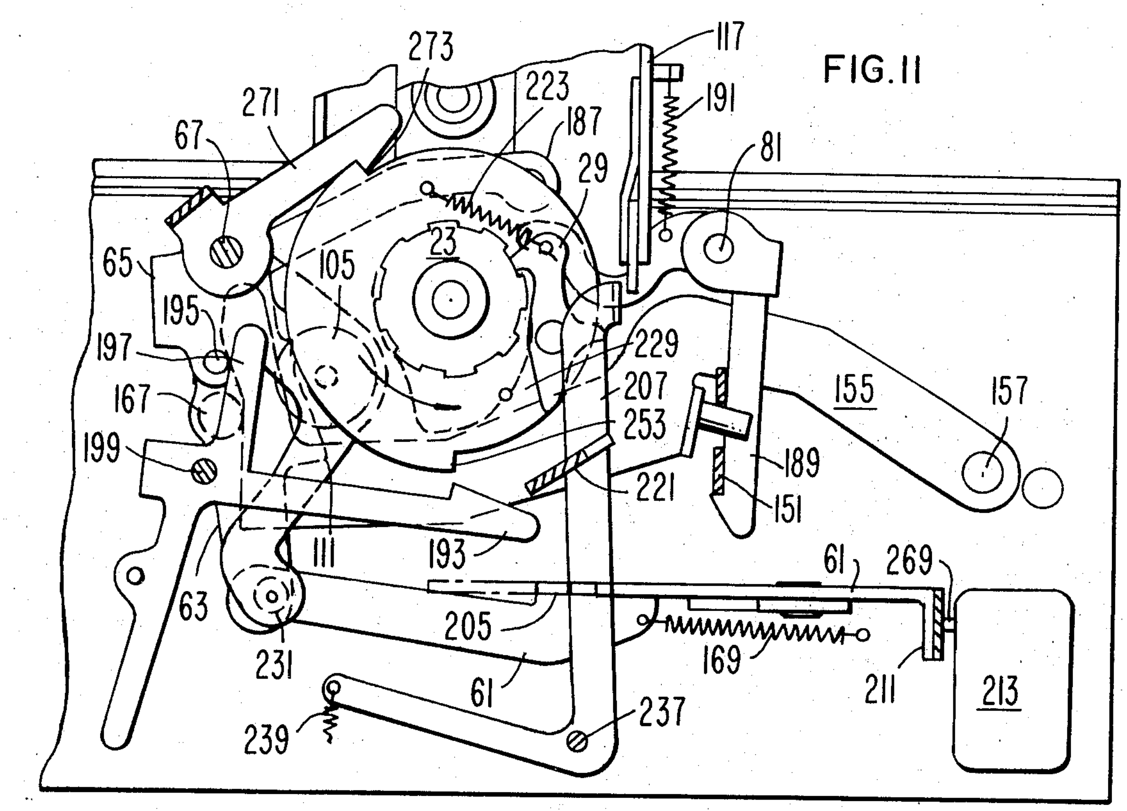
FIG. 11 is a partial left side elevation showing various of the operating parts associated with the cycle initiating and terminating means.
Figure 12:
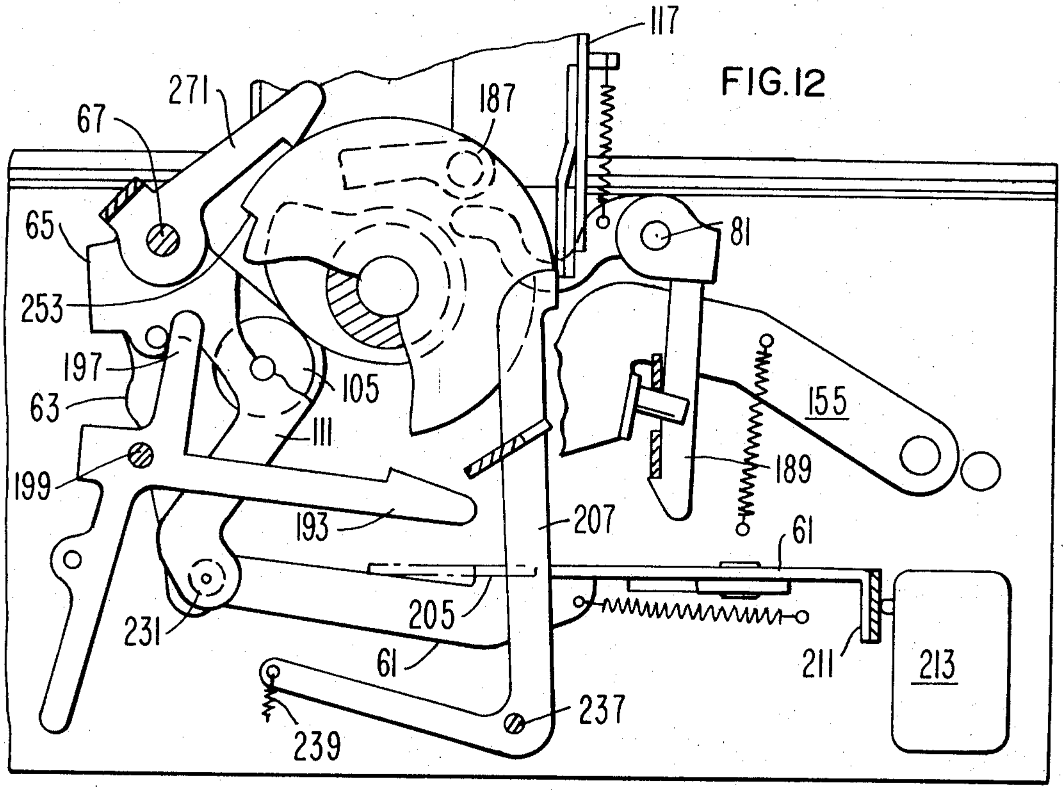
FIG. 12 is a fragmentary left side elevation showing certain of the parts of FIG. 11 in their operating states.

As previously suggested in connection with FIG. 6, release of the trip slide 61 is accomplished by the clockwise rotation of the retainer arm 155 by the forked link 151, the high point 165 of the retainer arm being thereby moved to a position above the roller 167 of the bail 65. Upon such release of the roller 167, the trip slide 61 is activated forwardly and the bail 65 to which the trip slide is attached is rotated in a counterclockwise direction on the shaft 67, by means of the spring 169. The counterclockwise rotation of the bail 65 is effective, by means of an upper arm 187 thereof, to release a latch member 189, which is also rotatably supported by the shaft 81, to the influence of a spring 191 connected to an arm thereof and to an anchor stud fixed to the front closure member 117. The resulting spring-urged clockwise rotation of the latch member 189 serves to latchably hold the forked link 151 and the key link 147 in a fully activated state throughout a read cycle, by means of the engagement of a latching portion of the member 189 with the undermost surface of the extension of the forked link 151. The counterclockwise rotation of the bail 65 is also effective to displace a lower hooked arm 193 from its blocking relationship relative to the cam disk 25, as shown in FIGS. 5 and 11, such displacement serving to permit the counterclockwise revolution of the cam disk 25 as viewed in the drawings. This displacement of the hooked arm 193 is accomplished by contact of an upper stud 195 of the bail 65 against an offset upright arm 197 of the lower hooked arm 193, the result being a clockwise rotation of the hooked arm 193 on a short floating shaft 199 of a hereinafter described biased rockable assembly generally designated at 201. The clockwise rotation of the hooked arm 193 is accompanied by the expansion of a spring 203 connected to a downwardly directed arm of the hooked arm 193 and to an anchor stud of the biased rockable assembly 201. It is also to be noted that the previously mentioned restoring roller 105 (FIGS. 3, 4 and 10), which was displaced from its home position on the shaft 107 by the leading edge of an inserted document, is also activated in a rightward arc by the counterclockwise rotation of the bail 65, the shaft 107 being carried by the downwardly directed arms 63 and 111 of the bail 65 as shown in FIGS. 4 and 6.

The forward activation of the trip slide 61 by the spring 169 results in the simultaneous accomplishment of several functions all of which are necessary to the initiation of a read cycle. The trip slide 61 may be characterized and described with reference to FIG. 2. As shown in FIG. 2, the trip slide 61 is provided with an extended offset right-angle projection 205 disposed at the approximate midpoint thereof, such extended projection being disposed in cooperating relationship with an upright clutch-dog actuator arm 207, and being supportably guided during the forward and return activation of the trip slide 61 by a horizontal slot formed in the auxiliary frame member 15, as illustrated in FIG. 3. FIG. 2 also illustrates the previously mentioned pivotal connection between the trip slide 61 and the limit arm 57 which serves to hold the upper roller assembly 41 in displaced relationship from the lower grooved roller 33, when the machine is at rest, such pivotal connection being shown at 209 in the drawing. The trip slide 61 is also provided with a downwardly directed offset projection 211 formed at its frontmost extremity, such projection being effective for closing the motor switch generally designated at 213. It is to be noted from FIG. 2 that a pivotal arm 215 having a web portion 217 at one extremity thereof and a latchable extension 219 formed on its opposite extremity, is mounted on a bracket integral with the frame member 15, such that the web portion 217 interposes the projection 211 of the trip slide 61 and the motor switch 213. The function of the pivotal arm 215 and the latchable extension 219 thereof is described in a later section.

By means of the above-described characteristics of the trip slide 61, its forward activation upon release of the trip slide retainer arm 155 is effective to produce the following functions, such functions occurring substantially simultaneously. The right angle projection 205 serves to displace the clutch-dog actuator arm 207 from its clutch-dog disabling position as shown in FIG. 2, the actuator arm being guidably supported in both its disabling and activating positions by a guide member 221 forming a part of the mounting 149, and being also pivotally mounted as hereinafter described. Displacement of the actuator arm 207 is effective to release the clutch dog 29 to the bias provided by a spring 223, such spring serving to engage the clutch dog 29 with the latch gear 23 to thereby couple the driving short shaft 21 with the driven shaft 27. Activation of the trip slide 61 is also effective to release the limit arm 57 to the bias of the spring 53, to thereby effectuate a predetermined counterclockwise pivoting action of the latter arm on the angle member 59, and to thereby activate the shaft 51 a predetermined distance in a forward direction to lower the upper roller assembly 41 into contact with the inserted document by means of the cradle arms 47 and 49. Forward activation of the trip slide 61 is also effective to close the motor switch 213, by means of the frontmost projection 211 thereof acting on the web portion 217 of the pivotal arm 215. It is to be noted that in closing the motor switch 213, the projection 211 of the trip slide also rotates the pivotal arm 215 in a clockwise direction, such rotation serving to latch the motor switch 213 in a closed position by means of a latch lever 225 pivotally mounted on the frame member 15 and activated into a latched position relative to the extension 219 by a spring 227 connected to the latch lever and to an anchor stud fixed to the frame member 15. With the motor switch 213 closed, the clutch dog 29 engaged with the latch gear 23, and the upper roller assembly 41 disposed in feedable contact with the inserted document, the cam disk 25, driven shaft 27, and column count wheel 35 are rotated for one or more complete revolutions in a counterclockwise direction, to thereby feed documents of predetermined varied lengths through the read station. When a punched document of 40 or less columns of coded information, such as a credit card or badge, has been inserted into the throat 5, the driven shaft 27 and column count wheel 35 will be rotated for one complete revolution, whereas two revolutions will occur when a document having from 40 to 80 columns of coded information has been inserted. Determination of the number of revolutions is controlled by cycle determinating means in response to the sensing of the trailing edge of the inserted document by the previously described sensor 113. When the trailing edge of the document passes the sensor 113, the spring 119 pivots the sensor and the rockable bail 121 such that the restoring roller 105 is returned to its home position on the shaft 107, such home position being in the patch of travel of a cam 229 fixed to the driven shaft 27, as best shown in FIG. 6. With the roller 105 so aligned, the cam 209 is effective to restore the bail 65 and the trip slide 61 to their home positions, and to permit the return of the retainer arm 155 to its blocking home position by the spring 159, the roller 167 of the bail 65 being thereafter retainably positioned on the flat surface 163 of the retainer arm. Coincidentally with the restoration of the bail 65 and trip slide 61, the latch member 189 is rotated in a counterclockwise direction by the upper arm 187 of the bail 65, to thereby release the forked link 151 and key link 147, and the upper roller assembly 41 is displaced from the lower grooved roller 33 by means of the clockwise rotation of the limit arm 57 against the bias of the spring 53 (as shown in FIG. 2). Upon release of the forked link 151, the bail 171 is restorably rotated on the shaft 173 by the spring 175 (FIG. 7), to thereby restorably rotate the enabling bail 93 on the shaft 87 by contact of the inboard arm thereof against the lower anchor stud to which the spring 177 is connected, and to thereby permit the restorable rotation of the stop bail 79 on the shaft 81 by the spring 83. The enabling levers 89 and 91 of the bail 93 and the prongs 77 of the stop bail 79 are accordingly elevated to their home positions.

Figure 13:
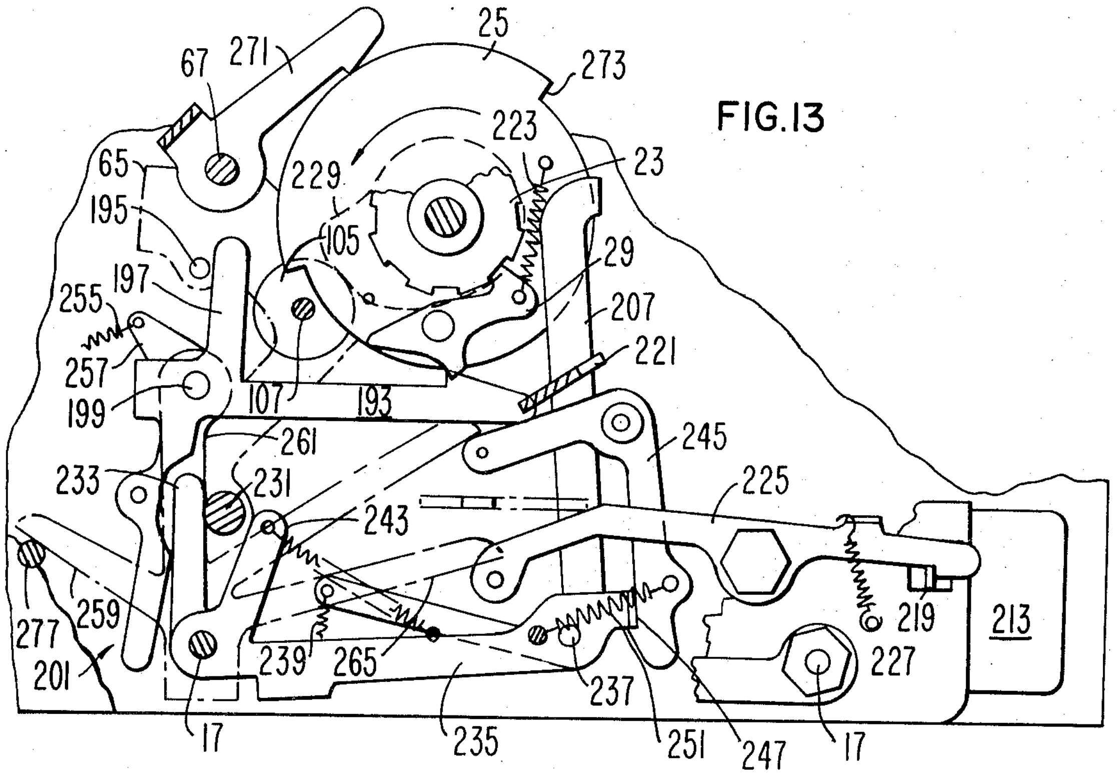
FIG. 13 is a fragmentary elevation showing various of the parts of the cam disk resetting means and the cycle terminating means with the latter parts disposed in their latched states.

Although the restoration of the trip slide 61 is effective to release the motor switch 213 and the clutch-dog actuator arm 207, hereinafter described release-delay means serves to retain the motor switch and the clutch dog in a closed and engaged state, respectively, to effectuate a predetermined minimal overthrow of the cam disk 25 and driven shaft 27 in said counterclockwise direction, said overthrow being accompanied by an overthrow activation of the bail 65 by the cam 229. During this overthrow activation, a roller 231 (FIG. 13) fixed to the arm 111 of the bail 65 contacts an upright arm 233 of a bail member 235 which is pivotally supported on the rearmost shaft 17 and provides pivotal support for the clutch-dog actuator arm 207 at a pivot point 237 thereof, the actuator arm 207 being biased in a counterclockwise direction on the pivot pont 237 by means of a spring 239 connected to an angularly disposed projection thereof and to an aperture formed in the web portion of the bail 235. The bail member 235 in turn is biased in a clockwise direction on the shaft 17 by a spring 241 connected to a second upright extension 243 thereof and to an anchor stud fixed to the frame member 15. The effect of the overthrow activation of the roller 231 on the upright arm 233 is to rotate the bail member 235 in a counterclockwise direction on the shaft 17, to thereby elevate the clutch-dog actuator arm 207 to a position where its uppermost offset projection is ineffective to disengage the clutch dog 29 from the latch gear 23 as the cam disk 25 approaches its normal home position. This counterclockwise rotation of the bail member 235, and elevation of the actuator 207, are perpetuated momentarily by the engagement of a latch 245 with an offset projection 247 of the bail 235, the latch 245 being pivotally mounted on the frame member 15 and having a stud 249 fixed to an extension thereof. Engagement of the latch 245 with the offset projection 247 is accomplished by a spring 251 connected to the latch 245 and to an anchor stud fixed to the frame member 15. With the bail member 235 and actuator arm 207 so latched, and with the previously described latching of the pivotal arm 215 by the latch lever 225, the motor switch 213 and the clutch dog 29 are retained in their closed and engaged states, respectively, during the hereinafter described resetting of the cam disk 25, the driven shaft 27 and the column count wheel 35 to their precise predetermined home positions, such precise home positions bearing a direct relationship to the standard distance between the leading edges of the documents and the first columns of coded information thereof.

Figure 14:
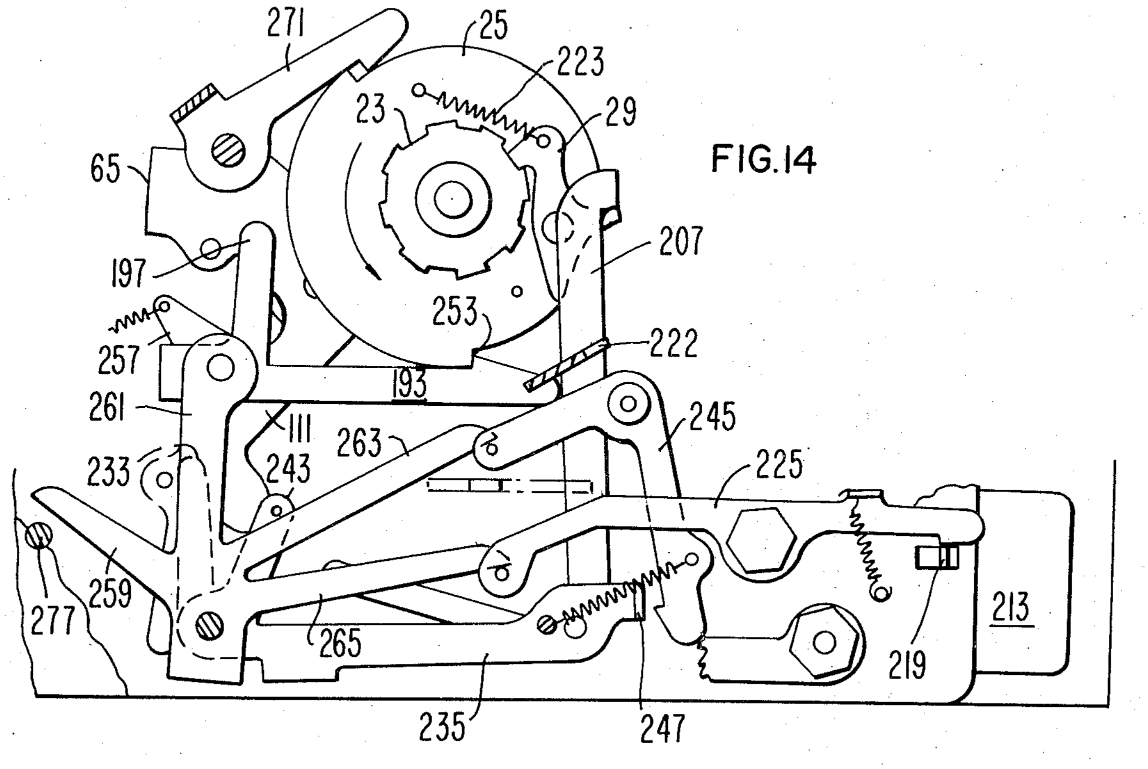
FIG. 14 is a fragmentary elevation similar to FIG. 13 and showing the cam disk in the process of being rotated in a clockwise resetting direction to thereby re-establish the precise home positioning of both the cam disk and the column count wheel.

As an incident to the clockwise return rotation of the bail 65 by the cam 229, the previously described upper stud 195 on the arm 111 moves away from the offset upright arm 197 of the lower hooked arm 193, the hooked arm 193 being accordingly rotated in a counterclockwise direction on the floating shaft 199 by the spring 203, as best shown in FIG. 5, the lower hooked arm 193 being accordingly moved into engageable relationship with an abutting surface 253 of the cam disk 25. As this abutting surface 253 comes into contact with the lower hooked arm 193, the biased rockable assembly previously referred to generally as 201 and comprised of an inner upright arm 257 and a plurality of integral outer arms designated 259, 261, 263 and 265, the inner upright arm 257 being connected to the outer arm 261 by the short floating shaft 199, is rotated a predetermined clockwise distance about the rearmost shaft 17 and against the bias of a spring 255 connected to the uppermost extremity of the inner arm 257 and an anchor stud fixed to the frame member 15. As the rockable assembly 201 is thus rotated about the shaft 17, the outer arm 263 releases the latch 245 by contacting the stud 249, to thereby permit the lowering of the bail 235 and the actuator arm 207 by means of the spring 241, and the outer arm 265 releases the latch lever 225 by contacting a stud 267 thereof, to permit the restoration of the pivotal arm 215. The actuator arm 207 is accordingly lowered to disengage the clutch dog 29 from the latch gear 23, and the motor switch 213 is opened by means of its biased plunger 269 (as best shown in FIG. 2). Following the disengagement of the clutch dog 29 and the opening of the motor switch 213, the rockable assembly 201 is returned counterclockwise to its predetermined home position by the spring 255 (FIG. 14), such home position being defined by the contact of the outer arm 259 against a limit stud 277 fixed to the frame member 15, the lower hooked arm 193 in cooperation with its abutting surface 253 thereby serving to rotate the cam disk 25, driven shaft 27 and column count wheel 35 in a clockwise direction until limited by the contact of an abutting surface 273 of the cam disk against an upper hooked arm 271 pivotally mounted on the shaft 67. With the cam disk 25 securely positioned between the lower hooked arm 193 and the upper hooked arm 271, and with the rockable assembly 201 held in its home position by the spring 255 with its outer arm 259 in contact with the limit stud 277, the cam disk 25, driven shaft 27 and column count wheel 35 are precisely located in a starting position for the ensuing read cycle. It is to be noted that the upper hooked arm 271 is biased in a clockwise direction on the shaft 67 by a spring 275 (FIG. 5) connected to the upper hooked arm and to an anchor stud fixed to the frame member 15. The upper hooked arm 271 is accordingly continuously biased into contact with the outer periphery of the cam disk 25 during the counterclockwise rotation thereof, and is effective to blockably limit the clockwise rotation of the cam disk during the return of the rockable assembly 201 and the lower hooked arm 193 to its home position.

It is to be understood that although a preferred embodiment of the subject document reading apparatus has been described in considerable detail, various modifications, substitutions, and rearrangements of the various parts may be made by one skilled in the art without departing from the true spirit and scope of the invention as herein described and claimed.

What is claimed is:

1. In apparatus for processing documents of predetermined varied widths, said documents having coded information fields arranged in columns and rows with the first column disposed in predetermined relationship to the leading edges thereof, said apparatus having reading means effective for reading coded information in synchronism with the generation of column count pulses produced by a column count wheel in conjunction with column count circuitry, and having also means for inhibiting said column count pulses when the last column of coded information on a document is read, the combination comprising:

a. document insertion and positioning means, b. cycle enabling means associated with said insertion and positioning means, c. cycle initiating means cooperating with said cycle enabling means, d. document feeding means associated with said column count wheel and responsive to said cycle initiating means, said means being effective for feeding a document past said reading means such that the generation of said column count pulses is synchronized with the reading of said coded information columns, said feeding means having a predetermined starting position relative to said positioning means, said predetermined starting position corresponding to the distance between said first column of coded information on the document and the leading edge thereof, e. means responsive to the leading and trailing edges of said predetermined varied width documents for activating and deactivating, respectively, said column count circuitry, f. cycle terminating means responsive to the sensing of the trailing edge of a document to terminate a read cycle of said apparatus, and g. means responsive to said cycle terminating means for precisely re-establishing said starting position of said document feeding means upon completion of a read cycle.

2. The apparatus defined in claim 1 wherein two predetermined width documents may be processed and read by said reading means, and wherein said means for activating and deactivating said column count circuitry comprises:

a. a first switch and associated sensor responsive to the leading edge of a first width document for activating said column count circuitry and responsive to the trailing edge of said first width document for deactivating said circuitry, and b. a second switch and associated sensor responsive to the leading edge of a second width document for activating said column count circuitry and responsive to the trailing edge of said second width document for deactivating said circuitry.

3. The apparatus defined in claim 1 wherein said document insertion and positioning means comprises:

a. an insertion throat comprised of a flat surface representing the path of travel of said documents through said processing apparatus, said surface being bordered on one longitudinal side thereof by a stationary bottom-edge support, and on the other longitudinal side by a biased movable support effective for holding a document inserted into said throat into abutting relationship with said stationary support, and b. a retractable stop bail defining a fully inserted position for a document entered into said throat, the location of said stop bail bearing a predetermined relationship to the distance between said leading edges of said documents and the first column of coded information thereon, said stop bail being retractable from the path of travel of an inserted document in response to said cycle initiating means.

4. The apparatus defined in claim 3 wherein said cycle enabling means comprises:

a pair of biased enabling levers responsive to the leading edge of a document inserted into said throat to limit against said retractable stop bail, said enabling levers being conditioned for a predetermined downward translation to thereby enable the operation of said cycle initiating means when a document inserted into said throat is properly oriented relative to its leading and trailing edges and to its top and bottom broadsides, said enabling levers being conditionally adapted according to the predetermined application of corner-cuts to the documents processable by said apparatus.

5. The apparatus defined in claim 3 wherein said document feeding means comprises:

a. a motor mounted on a frame member of said apparatus, b. a driving shaft rotatably connected to said motor, c. a driven shaft couplable with said driving shaft by means of a 1-revolution clutch for unitary rotation therewith, d. a lower elongated grooved roller fixed to said driven shaft and underlying said flat surface forming part of said insertion throat, the periphery of said grooved roller extending through apertures formed in said flat surface to contact the underside of a document inserted into said insertion throat, e. an upper elongated grooved roller rotatable by said driven shaft and rockably engageable with said periphery of said lower grooved roller extending through said flat surface of said insertion throat upon activation of said cycle initiating means, to thereby feedably pinch an inserted document therebetween for advancement thereof through said reading means, said latter means being accommodated by said grooves of said upper and lower elongated rollers.

6. The apparatus defined in claim 5 wherein said column count wheel is connected to said driven shaft opposite said 1-revolution clutch, and wherein said predetermined starting position of said document feeding means is defined by a predetermined starting position of said driven shaft and said column count wheel relative to said document insertion and positioning means.

7. The apparatus defined in claim 5 wherein said cycle terminating means comprises:

a. a cam fixed to and rotatable with said driven shaft, b. a third sensor responsive to the leading and trailing edges of said documents when inserted into said insertion throat and fed passed said reading means, and c. a translatable roller associated with said cycle initiating means and translatably displaceable from said cam by said third sensor in response to the sensing of the leading edge of an inserted document, said roller being translatably returnable to a cooperating relationship relative to said cam by said third sensor in response to the sensing of the trailing edge of a document being transported by said feeding means through said apparatus, said cooperating relationship of said cam and said roller serving to terminate a read cycle and to reset said document positioning means, said cycle enabling means, said cycle initiating means and said document feeding means to their respective home positions.

8. The apparatus defined in claim 5 wherein said means for re-establishing said starting position of said feeding means comprises:

a. a cam disk fixed to said driven shaft and associated with said 1-revolution clutch, said cam disk being provided with a first and second abutting surfaces disposed in spaced-apart relationship along the periphery thereof, b. a first biased hooked arm cooperably associated with said first abutting surface of said cam disk, said first hooked arm being displaceable from its said cooperable relationship relative to said first abutting surface by said cycle initiating means to thereby permit the rotation of said feeding means in a document-feed direction, and being also returnable to its said cooperable relationship relative to said first abutting surface by said cycle terminating means upon its said resetting of said cycle initiating means, c. a second biased hooked arm cooperably associated with said second abutting surface of said cam disk, said second hooked arm idling along the periphery of said cam disk during rotation of the driven shaft and cam disk in a document-feed direction, and blockably cooperating with said second abutting surface when said driven shaft and said cam disk are rotated in a counter-document-feed direction, and d. a rotatably mounted biased rockable assembly providing pivotal support for said first hooked arm, said rockable assembly being arcuately activated against its normal bias by contact of said first abutting surface of said cam disk against said first hooked arm upon termination of a read cycle by said cycle terminating means, said arcuate activation of said rockable assembly being produced by a predetermined overthrow activation of said driven shaft and said cam disk in a document-feed direction, said overthrow activation serving to deactivate said 1-revolution clutch and to uncouple said driven shaft from said driving shaft, following which uncoupling said normal bias of said rockable assembly is effective to return said cam disk, said driven shaft and said column count wheel in a counter-document-feed direction to said predetermined starting position of said document feeding means as defined by the precise positioning of said cam disk by means of said first and second hooked arms in cooperation with said first and second abutting surfaces.

9. In apparatus for processing documents of predetermined varied lengths, said documents having coded information fields arranged in columns and rows with the first column disposed in predetermined relationship to the leading edges thereof, said apparatus having reading means effective for reading coded information in synchronism with the generation of column count pulses produced by a column count wheel in conjunction with column count circuitry, and having also means for inhibiting said column count pulses when the last column of coded information on a document is read, the combination comprising:

a. document insertion and positioning means including an insertion throat,
b. cycle enabling means associated with said insertion and positioning means,
c. cycle initiating means cooperating with said cycle enabling means,
d. document feeding means associated with said column count wheel and responsive to said cycle initiating means, said means being effective for feeding a document past said reading means such that the generation of said column count pulses is synchronized with the reading of said coded information columns, said feeding means having a predetermined starting position corresponding to the distance between said first column of coded information on the document and the leading edge thereof,
e. means responsive to the leading and trailing edges of said predetermined varied length documents for activating and deactivating, respectively, said column count circuitry,
f. cycle terminating means responsive to the sensing of the trailing edge of a document to produce one or more operating cycles of said apparatus, and
g. means responsive to said cycle terminating means for precisely re-establishing said starting position of said document feeding means upon completion of a read cycle involving one or more operating cycles of said apparatus.

10. The apparatus defined in claim 9 wherein documents consisting of up to 80 columns of coded information may be processed and read by said reading means, and wherein one operating cycle is produced to read documents consisting of 40 or less columns of coded information, and two operating cycles are produced to read documents consisting of more than 40 columns of coded information.

11. The apparatus defined in claim 9 wherein said document feeding means comprises:

a. a motor mounted on a frame of said apparatus,
b. a driving shaft rotatably connected to said motor,
c. a driven shaft coupleable with said driving shaft by means of a 1-revolution clutch for unitary rotation therewith,
d. a lower elongated grooved roller fixed to said driven shaft, said roller being disposed in contacting relationship with the underside of a document positioned within said document insertion and positioning means, and
e. an upper elongated grooved roller rotatable by said driven shaft and rockably engageable with said lower grooved roller upon activation of said cycle initiating means, to thereby feedably pinch an inserted document therebetween for advancement through said reading means, said reading means being accommodated by said grooves of said upper and lower elongated rollers.

12. The apparatus defined in claim 11 wherein said column count wheel is connected to said driven shaft opposite said 1-revolution clutch, and wherein said predetermined starting position of said document feeding means is defined by a predetermined starting position of said driven shaft and said column count wheel relative to said document insertion and positioning means.

13. The apparatus defined by claim 11 wherein said cycle terminating means comprises:

a. a cam fixed to and rotatable with said driven shaft,
b. a sensor responsive to the leading and trailing edges of said predetermined varied length documents when inserted into said insertion throat and fed past said reading means, and
c. a translatable roller associated with said cycle initiating means and translatably displaceable from said cam by said sensor in response to the sensing of the leading edge of an inserted document, said roller being translatably returnable to a cooperating relationship relative to said cam by said sensor in response to the sensing of the trailing edge of a document being transported by said feeding means through said apparatus, said cooperating relationship between said cam and said roller serving to terminate a read cycle and to reset said document positioning means, said cycle enabling means, said cycle initiating means and said document feeding means to their respective home positions, said termination of said read cycle occurring after one operating cycle of said 1-revolution clutch and said processing apparatus when the document being processed consists of 40 or less columns of coded information, and occurring after two operating cycles of said 1-revolution clutch and said processing apparatus when the document being processed consists of more than 40 columns of coded information.

14. In apparatus for reading documents of predetermined varied widths and lengths, said documents having coded information arranged in columns and rows with the first columns disposed in predetermined relationship to the leading edges thereof, said apparatus including document positioning means, cycle initiating means, document feed means, reading means, and cycle terminating means, said document feed means and said reading means having a predetermined starting position relative to said positioning means and corresponding to the distance between said first columns of coded information and the leading edges of said documents, said reading means being effective for reading coded information in synchronism with the generation of column count pulses produced by a column count wheel in conjunction with column count circuitry, the improvement comprising:

a. means responsive to the leading edges of said documents for activating said column count circuitry, b. means responsive to the trailing edges of said documents for inhibiting said generation of said column count pulses when the last column of coded information on a document is read, c. means responsive to the trailing edges of said documents and cooperating with said cycle terminating means to thereby produce one or more operating cycles of said document feed means according to said predetermined varied length of the document being fed thereby, and d. means responsive to said cycle terminating means for re-establishing said predetermined starting position of said document feed means relative to said positioning means upon the completion of a read cycle involving said one or more operating cycles of said document feed means.

15. The apparatus defined in claim 14 wherein said document feed means includes a driving shaft, a driven shaft, and a 1-revolution clutch for coupling said driven shaft to said driving shaft, and wherein said means for producing said one or more operating cycles of said document feed means is ineffective to influence the normal uncoupling operation of said 1-revolution clutch when a document of less than a predetermined length is being feed by said feed means, while being effective to neutralize and delay said normal uncoupling operation of said 1-revolution clutch when a document of more than a predetermined length is being fed by said document feed means.

16. The apparatus defined in claim 15 wherein said means for re-establishing said predetermined starting position of said document feed means relative to said positioning means comprises:

a. a cam disk fixed to said driven shaft and forming a part of said 1-revolution clutch, said cam disk having a first and second abutting surfaces disposed in spaced-apart relationship along the periphery thereof, b. a first biased hooked arm cooperably associated with said first abutting surface, said hooked arm being displaceable from said first abutting surface by said cycle initiating means to thereby permit rotation of said feed means in a document feed direction, c. a second biased hooked arm cooperably associated with said second abutting surface, said second hooked arm idling along the periphery of said cam disk during rotation thereof in a document feed direction, and blockably cooperating with said second abutting surface when said cam disk is rotated in a counter-document-feed direction, and d. a rotatably mounted biased rockable assembly providing pivotal support for said first hooked arm, said rockable assembly being arcuately activated against its normal bias by said cam disk and said first hooked arm during a predetermined overthrow activation of said driven shaft by said cycle terminating means, said overthrow activation serving to uncouple said driven shaft from said driving shaft whereby said bias of said rockable assembly is effective to return said cam disk, said driven shaft and said column count wheel in a counter-document-feed direction to said predetermined starting position of said document feed means as defined by the precise positioning of said cam disk by said first and second hooked arms in cooperation with said first and said second abutting surfaces.

* * * * *